(12) United States Patent
Makino et al.

(10) Patent No.: US 11,624,965 B2
(45) Date of Patent: Apr. 11, 2023

(54) OPTICAL WAVEGUIDE DEVICE

(71) Applicant: Fujitsu Optical Components Limited, Kawasaki (JP)

(72) Inventors: Shuntaro Makino, Kawasaki (JP); Yoshinobu Kubota, Yokohama (JP); Yasuhiro Ohmori, Sapporo (JP); Masaharu Doi, Sapporo (JP); Teruo Kurahashi, isehara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 22 days.

(21) Appl. No.: 17/350,627

(22) Filed: Jun. 17, 2021

(65) Prior Publication Data
US 2022/0050351 A1 Feb. 17, 2022

(30) Foreign Application Priority Data
Aug. 13, 2020 (JP) .............................. JP2020-136733

(51) Int. Cl.
*G02F 1/225* (2006.01)
*G02F 1/035* (2006.01)
*G02F 1/21* (2006.01)

(52) U.S. Cl.
CPC ............ *G02F 1/2257* (2013.01); *G02F 1/035* (2013.01); *G02F 1/212* (2021.01)

(58) Field of Classification Search
CPC ........ G02F 1/2257; G02F 1/035; G02F 1/212; G02F 1/0316; G02F 1/218; G02B 6/12; G02B 2006/1204
See application file for complete search history.

(56) References Cited

U.S. PATENT DOCUMENTS

| 5,404,412 A | 4/1995 | Seino et al. |
| 9,002,165 B2 * | 4/2015 | Ichioka .................... G02B 6/12 385/141 |
| 2004/0264832 A1 | 12/2004 | Kondo et al. |
| 2014/0050440 A1 | 2/2014 | Ichioka et al. |

FOREIGN PATENT DOCUMENTS

| JP | 5-257105 | 10/1993 |
| WO | WO 2012/147914 A1 | 11/2012 |
| WO | WO 2019/180922 A1 | 9/2019 |

* cited by examiner

*Primary Examiner* — John Bedtelyon
(74) *Attorney, Agent, or Firm* — Staas & Halsey LLP

(57) ABSTRACT

An optical waveguide device includes an intermediate layer, a thin-film LN layer including X-cut lithium niobate, and a buffer layer stacked on a substrate; an optical waveguide formed in the thin-film LN layer; and an electrode for driving. The intermediate layer is formed by an upper first intermediate layer and a lower second intermediate layer, the second intermediate layer having a permittivity that is smaller than a permittivity of the first intermediate layer.

20 Claims, 8 Drawing Sheets

OPTICAL WAVEGUIDE DEVICE

CROSS REFERENCE TO RELATED APPLICATIONS

This application is based upon and claims the benefit of priority of the prior Japanese Patent Application No. 2020-136733, filed on Aug. 13, 2020, the entire contents of which are incorporated herein by reference.

FIELD

The embodiments discussed herein are related to an optical waveguide device.

BACKGROUND

High-performance optical devices are indispensable for achieving high-speed optical communication. In an optical device, a conventional LN optical modulator uses a lithium niobate ($LiNbO_3$, hereinafter, LN) substrate, whereby favorable characteristics may be obtained in terms of insertion loss and transmission characteristics. On the LN substrate, an optical waveguide is formed by titanium (Ti) diffusion. In a conventional LN optical modulator using such an LN substrate (hereinafter, bulk LN modulator), optical field is large and accordingly, electrode spacing is wide, thereby facilitating design of impedance to a reference impedance (50Ω) of a peripheral circuit.

In recent years, demand for smaller optical devices has increased and reduction of the size of LN optical modulators used in optical transceivers is also being studied. A thin-film LN optical modulator that uses a thin-film LN is one such LN optical modulator having a smaller size. The thin-film LN optical modulator has a Mach-Zehnder interferometer structure and a structure in which layers such as an intermediate layer, a thin-film LN, a buffer layer, and electrodes are provided on a substrate.

Arts related to a thin-film LN optical modulator disclose, for example, a structure in which a liquid polymer substrate is provided on a holding substrate, an LN substrate of an optical waveguide is adhered on the liquid polymer substrate via an adhesive layer, directions of two axes of anisotropy of thermal expansion coefficients of the optical waveguide substrate and the holding substrate are aligned, reducing stress applied to a bonded portion. Further, a composite substrate has been disclosed in which a low-refractive index layer and an amorphous layer are provided between an electro-optical crystal substrate and a low-permittivity substrate, whereby an adhesive layer is unnecessary. Further, a structure has been disclosed in which an optical waveguide having an electro-optic material is bonded on a support by a bonding layer (for example, refer to International Publication No. WO 2012/147914, International Publication No. WO 2019/180922, U.S. Patent Application Publication No. 2004/0264832).

Further, for example, a technique of stabilizing DC drift characteristics by including in the intermediate layer, a material containing a metal element corresponding to group 3 to group 18 of the periodic table has been disclosed (for example, refer to Japanese Laid-Open Patent Publication No. H05-257105, U.S. Pat. No. 5,404,412.

SUMMARY

According to an aspect of an embodiment, an optical waveguide device includes an intermediate layer, a thin-film LN layer including X-cut lithium niobate, and a buffer layer stacked on a substrate; an optical waveguide formed in the thin-film LN layer; and an electrode for driving. The intermediate layer is formed by an upper first intermediate layer and a lower second intermediate layer, the second intermediate layer having a permittivity that is smaller than a permittivity of the first intermediate layer.

An object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF THE INVENTION

First, problems associated with the conventional techniques are discussed. For a thin-film LN optical modulator, optical field is small as compared to a LN optical modulator and accordingly, the electrode spacing is also narrow, whereby impedance becomes lower than the of impedance a peripheral circuit. Mismatch of the impedance prevents highly efficient connection of the thin-film LN optical modulator and the peripheral circuit. The peripheral circuit, for example, is a driver IC, a termination substrate or a relay substrate to which an electrode is connected.

Here, while the impedance may be increased by increasing the electrode spacing, electric field efficiency decreases.

Further, while the impedance may be increased by increasing the thickness of the intermediate layer, due to manufacturing process, it is difficult to increase the film thickness of an intermediate layer material for suppressing DC drift, which is a problem peculiar to LN. In the conventional technique, the thin-film LN optical modulator can only be raised to about 200 and a special matching circuit is necessary for connection of the peripheral circuit.

Embodiments of an optical waveguide device will be described with reference to the accompanying drawings. In the embodiments, a thin-film LN optical modulator is described as an example of the optical waveguide device. The thin-film LN optical modulator is provided in an optical transmitting unit for optical transmission, the thin-film LN optical modulator converting input electrical signals into optical signals and optically transmitting the signals.

Figure 1:
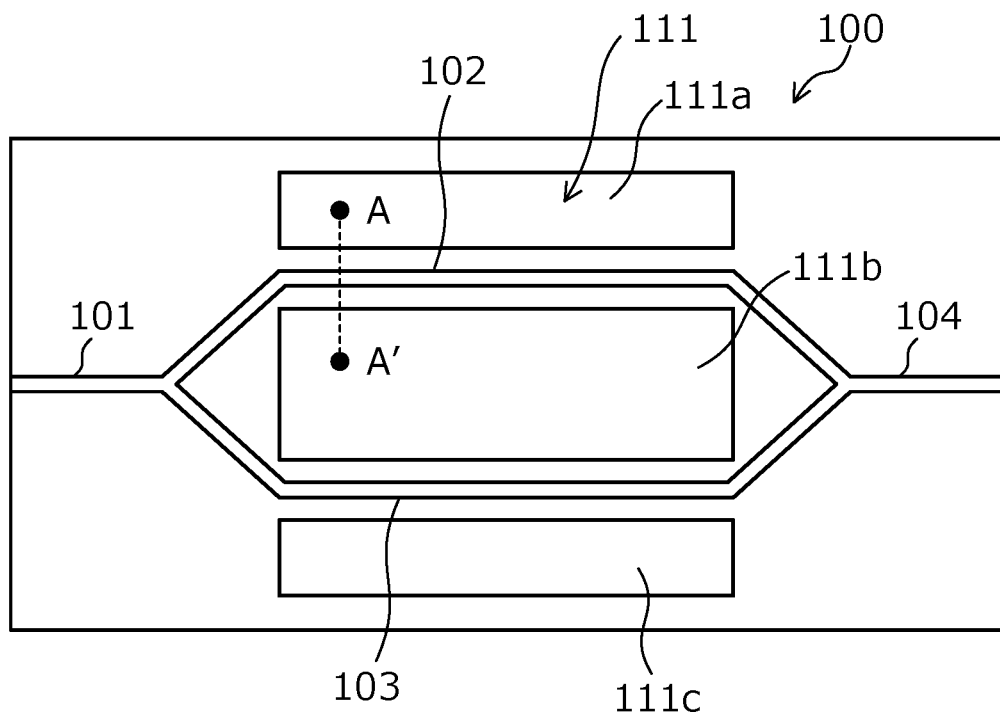
FIG. 1 is a plan view of a thin-film LN optical modulator according to an embodiment.
Figure 2:
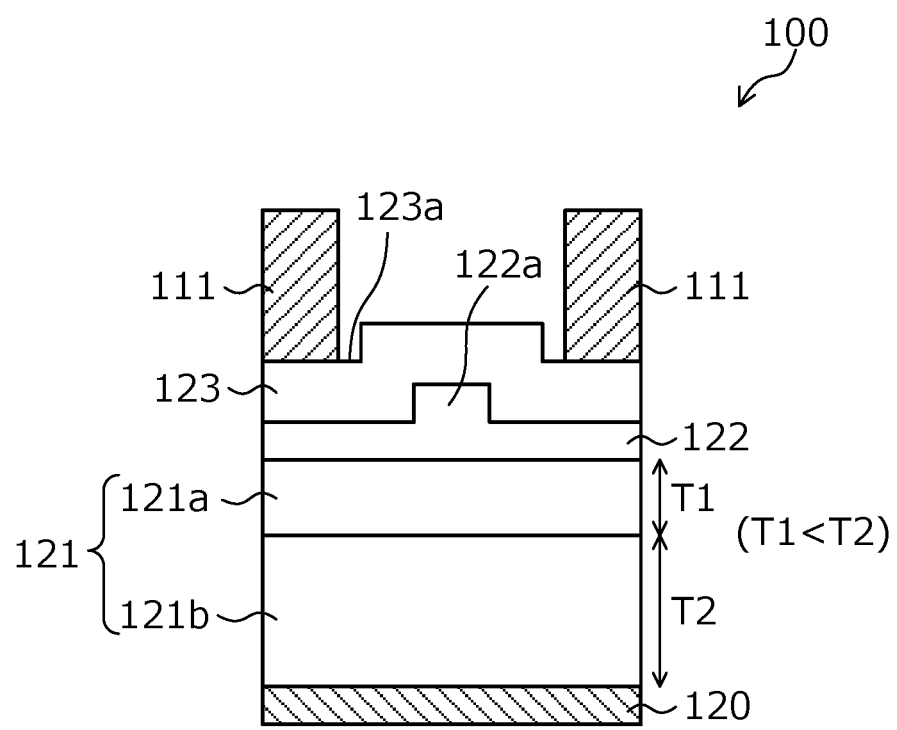
FIG. 2 is a cross-sectional view of the thin-film LN optical modulator according to the embodiment.

FIG. 1 is a plan view of the thin-film LN optical modulator according to the embodiment; FIG. 2 is a cross-sectional view of the thin-film LN optical modulator according to the embodiment. FIG. 2 depicts a cross-section along cutting line A-A' in FIG. 1. In the embodiment, a thin-film LN optical modulator 100 is described as an example of the optical waveguide device.

The thin-film LN optical modulator 100 described herein is a Mach-Zehnder-type optical modulator and the thin-film LN optical modulator 100 modulates light propagated in an optical waveguide by applying voltage to a Mach-Zehnder interferometer formed by the optical waveguide that exhibits the electro-optic effect.

An optical waveguide 101 branches into two optical waveguides 102, 103 and thereafter is combined into the optical waveguide 104. Electrodes 111 (111a, 111b, 111c) are provided on each side of the branched optical waveguides 102, 103.

When voltage V of the electrodes 111 is 0, light input to the optical waveguide 101 is divided into two beams, travels through the optical waveguides 102, 103, and is combined and output by the optical waveguide 104. Further, when voltage $V\pi$ is applied to the electrodes 111, reverse electric field is generated in the optical waveguides 102, 103 and a change in the refractive index causes a difference in phase between the light traveling in the optical waveguide 102 and the light traveling in the optical waveguide 103. While the two beams of light interfere and cancel each other out in an instance of voltage that causes the phase difference to be $\pi$, by changing the applied voltage 0-$V\pi$, intensity-modulated optical output may be obtained.

As depicted in FIG. 2, the thin-film LN optical modulator 100 is a structure in which an intermediate layer 121, a thin-film LN layer 122, and a buffer layer 123 are stacked on a substrate 120. In the substrate 120, for example, LN, Si, $SiO_2$, etc. is used. In the thin-film LN layer 122, lithium niobate ($LiNbO_3$) having X-cut crystal orientation is used, and a ridge-type optical waveguide is formed by etching. A convex ridge portion functions as an optical waveguide 122a through which the light travels. The optical waveguide 122a depicted in FIG. 2 corresponds to the optical waveguide 102 depicted in FIG. 1.

In the thin-film LN layer 122, X-cut lithium niobate is used. As a result, a need to apply electric field in a vertical direction of the optical waveguide 122a is eliminated and the electrodes 111 are disposed on the sides of the optical waveguide 122a, and by applying electric field from a horizontal direction, light may be confined to a small region (the optical waveguide 122a). Further, electric field efficiency may be improved by reducing the interval between the optical waveguide 122a and the electrodes 111.

The intermediate layer 121 and the buffer layer 123 are provided to strengthen confinement of the light to the optical waveguide 122a formed in the thin-film LN layer 122. In the intermediate layer 121 and the buffer layer 123, a material having a refractive index smaller than that of the thin-film LN layer 122 is used, such as, for example, $SiO_2$.

As a method of fabricating a layered structure, direct bonding of a wafer may be used. In this instance, when an adhesive layer for bonding is necessary, the adhesive layer may be between any layers of the layered structure.

In a configuration example depicted in FIG. 2, the buffer layer 123 having a predetermined thickness is stacked on the thin-film LN layer 122. Here, the buffer layer 123 is formed in a shape that follows a convex shape of the ridge portion of the optical waveguide 122a, and has a constant thickness at the sides and a top of the optical waveguide 122a. Here, in the buffer layer 123, recesses 123a corresponding to the convex shape of the optical waveguide 122a are formed on both sides of the optical waveguide 122a, a predetermined distance from the optical waveguide 122a. The electrodes 111 are disposed on the recesses 123a. The electrodes 111 may be formed by vapor deposition of, for example, gold (Au).

Here, the thin-film LN optical modulator 100 is a traveling-wave-electrode-type optical modulator, and group refractive indices (corresponds to traveling speeds) Nm for light and for electricity have to be matched with each other. Here, the group refractive index for light is more difficult to adjust as compared to that for electricity.

Further, characteristic impedances ZO have to be matched to connect the thin-film LN optical modulator 100 and a peripheral circuit (relay substrate, termination substrate, driver IC, etc.) with high efficiency. Here, the characteristic impedance of the peripheral circuit is more difficult to adjust as compared to that for the optical modulator.

Therefore, the inventors tried the following measures to address these issues. (1) In the thin-film LN optical modulator 100, to suppress DC drift, which is a unique issue, the permittivity of the intermediate layer 121 was increased by using a material containing a metal element of any of group 3 to group 18 of the periodic table, in the intermediate layer 121.

In the thin-film LN optical modulator 100, a phenomenon called DC drift occurs in which, after sufficient time has elapsed, the voltage applied to the electrodes 111 varies relative to the instant that the voltage was applied. Variation of the voltage appears as a change in output light output by the thin-film LN optical modulator 100 and therefore, suppression of DC drift is indispensable for stabilizing operation of the thin-film LN optical modulator 100. The amount of DC drift is proportional to the applied voltage and therefore, in general, is expressed as a percentage of the applied voltage.

(2) The permittivity of the intermediate layer 121 is increased, whereby the group refractive index Nm for electricity increases. Nonetheless, the group refractive index Nm for electricity and the group refractive index Nm for light deviate from each other.

(3) When the thickness of the electrodes 111 is increased to lower the group refractive index Nm for electricity, the characteristic impedance ZO decreases. Nonetheless, the thin-film LN optical modulator 100 deviates from the peripheral circuit in terms of ZO.

(4) The permittivity of the substrate 120 is higher than that of the intermediate layer 121 and therefore, the intermediate layer 121 is made thicker so that overall permittivity decreases from the perspective of the electrodes 111. However, increasing the thickness of the material of the intermediate layer 121 that is for suppressing DC drift is difficult.

Therefore, in the embodiment, the intermediate layer 121 is formed by multiple layers. In the configuration example in FIG. 2, an upper first intermediate layer 121a is formed having a thickness T1 and a lower second intermediate layer 121b is formed having a thickness T2 (T1<T2). The first intermediate layer 121a is provided for DC drift suppression and the second intermediate layer 121b is provided to increase the thickness of an entire area of the intermediate layer 121.

Here, the first intermediate layer 121a may be configured using materials of example_a to example_j below for DC drift suppression.

In example_a, a material containing a metal element of any of group 3 to group 18 of the periodic table is used in the first intermediate layer 121a. In example_b, a material containing an oxide of indium and silicon oxide is used in the first intermediate layer 121a. In example_c, a material containing an oxide of titanium and silicon oxide is used in the first intermediate layer 121a. In example_d, a material containing an oxide of tin and silicon oxide is used in the first intermediate layer 121a. In example_e, a material containing an oxide of germanium and silicon oxide is used in the first intermediate layer 121a. In example_f, a material containing an oxide of zinc and silicon oxide is used in the first intermediate layer 121a. In example_g, in addition to any of the materials of examples_b to f above, a material further containing an oxide of another metal or semiconductor element is used for the first intermediate layer 121a. In example_h, a mixture or compound of silicon oxide and an oxide of at least one species of a metal element of any of group 3 to group 18 of the periodic table is used in the first intermediate layer 121a. In example_i, a mixture or compound of silicon oxide and an oxide of at least one species of a semiconductor element excluding silicon is used in the first intermediate layer 121a. In example_j, a mixture or compound of silicon oxide and an oxide containing at least one species of a semiconductor element excluding silicon and at least one species of a metal element of any of group 3 to group 18 of the periodic table is used in the first intermediate layer 121a.

In this manner, DC drift of the thin-film LN optical modulator 100 may be suppressed by configuring the first intermediate layer 121a using any one of the materials of example_a to example_j.

Further, in the embodiment, a permittivity ε2 of the second intermediate layer 121b is set to be smaller than a permittivity ε1 of the first intermediate layer 121a (ε1>ε2).

Between the intermediate layer 121 (the first intermediate layer 121a) and the substrate 120, a dielectric layer (the second intermediate layer 121b) having a permittivity lower than that of the intermediate layer 121 (the first intermediate layer 121a) is provided, whereby the overall permittivity decreases from the perspective of the electrodes 111.

As a result, the thin-film LN optical modulator 100 of the embodiment may simultaneously achieve high impedance and narrow electrode spacing corresponding to the small optical field, thereby enabling highly efficient connection of the peripheral circuit. Further, without increasing the thickness of the intermediate layer to suppress DC drift, a thickness that is actually manufacturable may be set.

Figure 3:
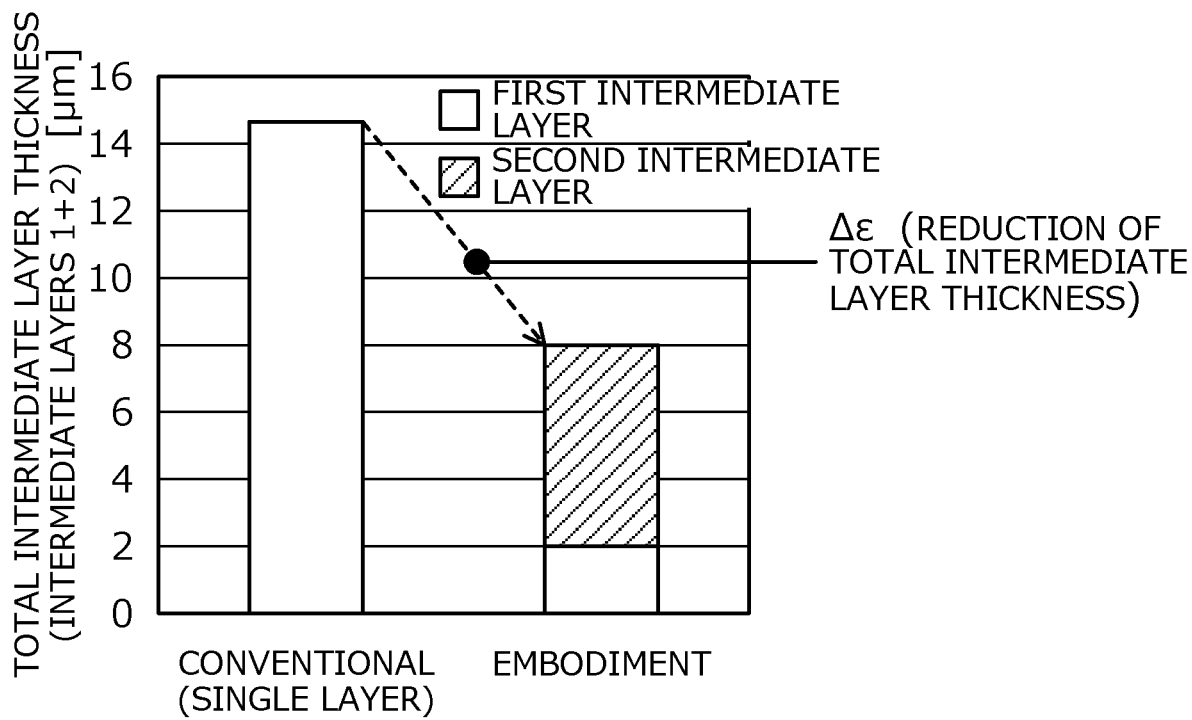
FIG. 3 is a chart depicting layer thickness reduction by a two-layer intermediate layer according to the embodiment.

FIG. 3 is a chart depicting layer thickness reduction by a two-layer intermediate layer according to the embodiment. A vertical axis indicates total intermediate layer thickness. Reference impedance Z0 of the thin-film LN optical modulator 100, the group refractive index Nm, and interval of the electrodes 111 are fixed.

In a conventional single-layer (corresponds to the permittivity ε1=ε2) intermediate layer, a layer thickness exceeding 14 μm is necessary as the total intermediate layer. This thickness is difficult to manufacture. Further, the intermediate layer could not be manufactured having the necessary thickness and only about 200 could be obtained for the characteristic impedance Z0 of the thin-film LN optical modulator 100. Moreover, deviation with respect to the reference characteristic impedance Z0 (50Ω) of the peripheral circuit occurs and a special external matching circuit or the like is necessary.

In contrast, in the embodiment, the permittivity ε1 of the first intermediate layer 121a and the permittivity ε2 of the second intermediate layer 121b are set as ε1>ε2, thereby enabling formation such that the thickness T1 of the first intermediate layer 121a is 2 μm, and the thickness T2 of the second intermediate layer 121b is 6 μm (the total intermediate layer thickness is 8 μm).

In the chart, Δε is an amount of reduction of the total intermediate layer thickness obtained by the configuration (ε1−ε2=2) of the embodiment and according to the embodiment, the intermediate layer 121 may be set to a thickness that is actually manufacturable.

Figure 4A:
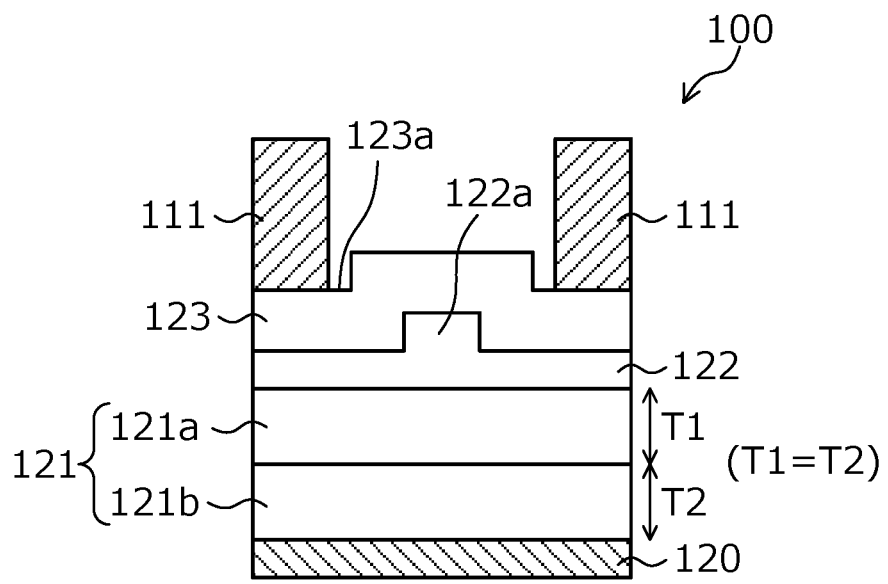
FIG. 4A is a cross-sectional view of a configuration example in which layer thickness of an intermediate layer of the thin-film LN optical modulator according to the embodiment is changed.
Figure 4B:
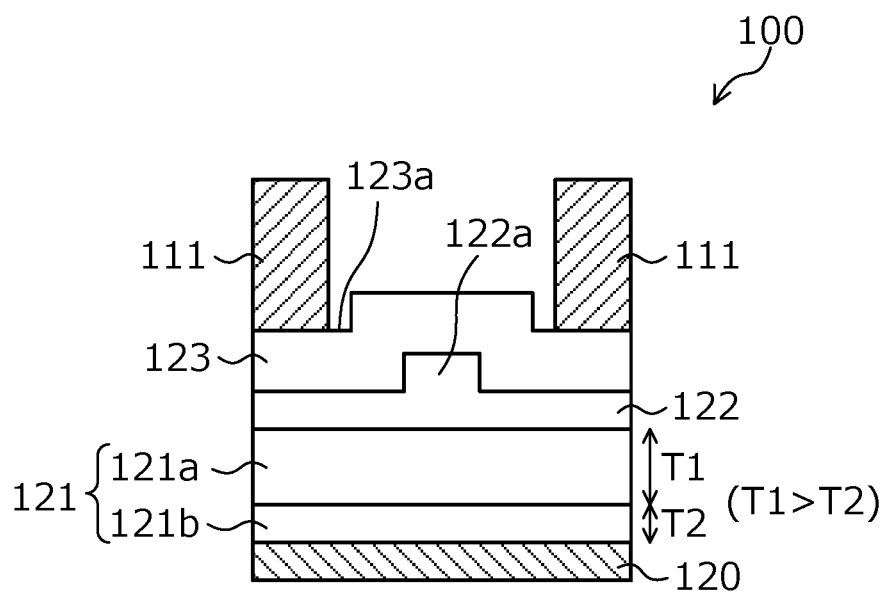
FIG. 4B is a cross-sectional view of a configuration example in which layer thickness of the intermediate layer of the thin-film LN optical modulator according to the embodiment is changed.

FIGS. 4A and 4B are cross-sectional views of configuration examples in which the layer thickness of the intermediate layer of the thin-film LN optical modulator according to the embodiment is changed. As described above, under the condition that the permittivity of the second intermediate layer 121b is smaller than the permittivity of the first intermediate layer 121a, the layer thicknesses of the first intermediate layer 121a and the second intermediate layer 121b may be changed.

In the configuration example depicted in FIG. 4A, the thickness T1 of the first intermediate layer 121a and the thickness T2 of the second intermediate layer 121b are substantially the same thickness (T1=T2). In the configuration example depicted in FIG. 4B, the thickness T1 of the first intermediate layer 121a is thicker than the thickness T2 of the second intermediate layer 121b (T1>T2). Under the condition that the permittivity of the second intermediate layer 121b is smaller than the permittivity of the first intermediate layer 121a, the first intermediate layer 121a and the second intermediate layer 121b may each be set to have predetermined thicknesses within a range of thicknesses that are manufacturable.

Figure 5:
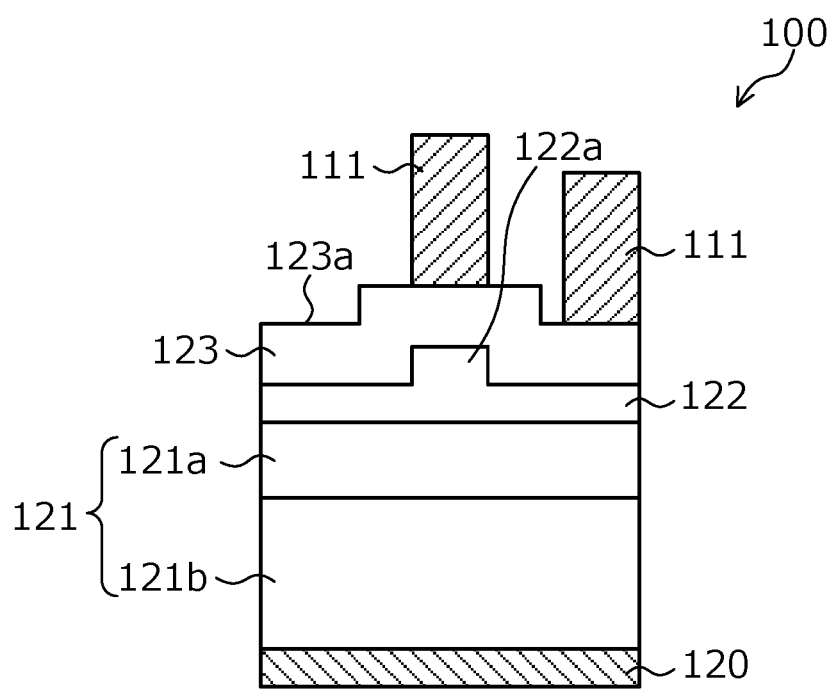
FIG. 5 is a cross-sectional view of another configuration example of the thin-film LN optical modulator according to the embodiment.

FIG. 5 is a cross-sectional view of another configuration example of the thin-film LN optical modulator according to the embodiment. In the configuration examples described above, X-cut lithium niobate is used in the thin-film LN layer 122, and a configuration example of X-cut LN is depicted in which the optical waveguide 122a is sandwiched by the electrodes 111 on the sides thereof and electric field is applied in a horizontal direction. FIG. 5 depicts the thin-film LN optical modulator 100 in an instance in which Z-cut lithium niobate is used for the thin-film LN layer 122. In this instance, the electrode 111 is formed on the optical waveguide 122a and Z-cut LN applying electric field in a vertical direction may be configured.

In the thin-film LN optical modulator 100 that is a Z-cut LN type depicted in FIG. 5, narrow electrode spacing and high impedance may be achieve simultaneously.

FIGS. 6A, 6B, 6C, and 6D are cross-sectional views of other configuration examples of the thin-film LN optical modulator according to the embodiment. In the configuration examples depicted in FIGS. 6A, 6B, 6C, and 6D, to improve the electric field efficiency, bottoms of the electrodes 111 are provided at positions lower than a position of the surface of the buffer layer 123. In the configuration examples depicted in FIGS. 6A, 6B, 6C, and 6D, near the optical waveguide 122a, a predetermined thickness is left as the buffer layer 123 and the positions of portions where the electrodes 111 are to be formed lowered.

Figure 6A:
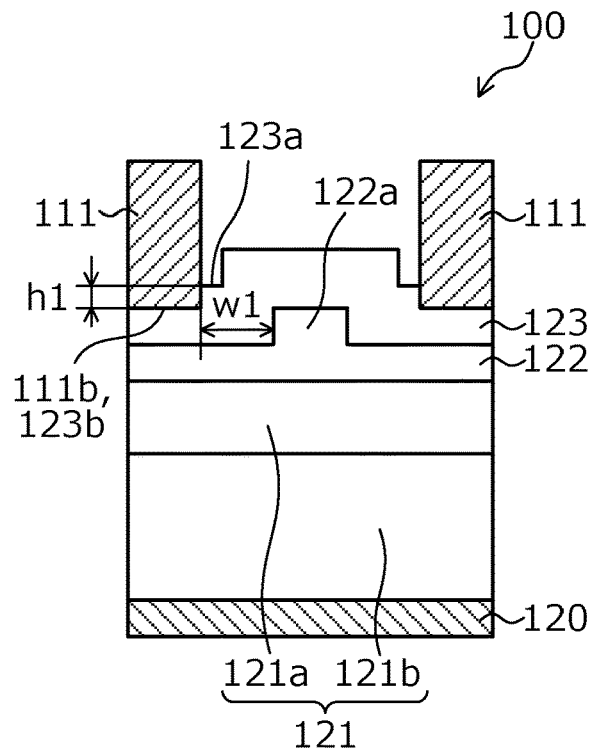
FIG. 6A is a cross-sectional view of another configuration example of the thin-film LN optical modulator according to the embodiment.

In the configuration example in FIG. 6A, portions of the buffer layer 123 where the electrodes 111 are to be provided (the recesses 123a) are etched. The electrodes 111 are provided on both sides of the optical waveguide 122a (as a center) separated by a predetermined distance. In the buffer layer 123, at the portions where the electrodes 111 are to be provided, steps 123b are formed by the etching of the buffer layer 123.

Subsequently, the electrodes 111 are formed on the steps 123b of the buffer layer 123. As a result, positions in a height direction of bottoms 111b of the electrodes 111 provided on the steps 123b are lower, by a height h1, than the positions of the recesses 123a of the buffer layer 123 before etching.

Further, the electrodes 111 are provided on the portions of the steps 123b of the buffer layer 123, whereby the electrodes 111 have a distance (width) w1 from the optical waveguide 122a and may be as close as possible thereto. The width w1 corresponds to a predetermined thickness when the buffer layer 123 is stacked on the thin-film LN layer 122 and has an effect of confining light to the optical waveguide 122a.

In this manner, the steps 123b are formed in portions of the buffer layer 123 where the electrodes 111 are to be formed, whereby the thickness itself of the buffer layer 123 is assured with the optical waveguide 122a as a center and the electrodes 111 may be disposed near the optical waveguide 122a. As a result, the thin-film LN optical modulator 100 having small scattering loss and high electric field efficiency may be realized.

Figure 6B:
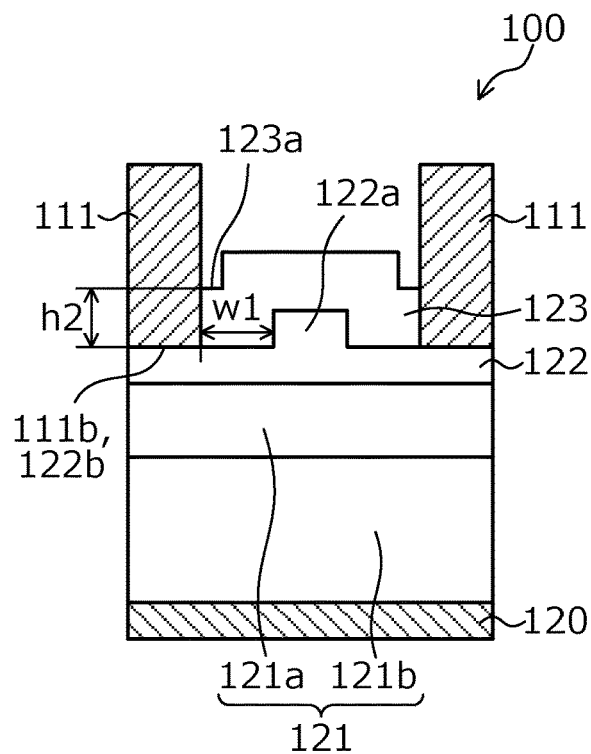
FIG. 6B is a cross-sectional view of another configuration example of the thin-film LN optical modulator according to the embodiment.
Figure 6C:
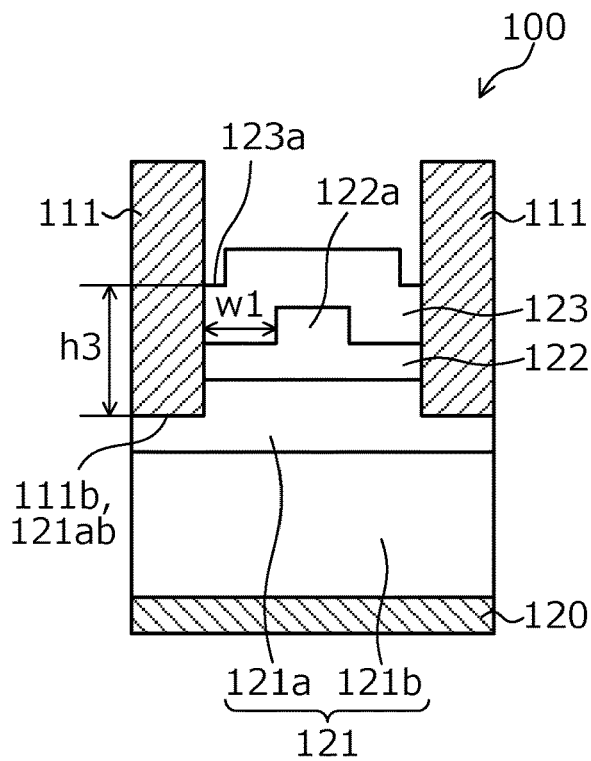
FIG. 6C is a cross-sectional view of another configuration example of the thin-film LN optical modulator according to the embodiment.
Figure 6D:
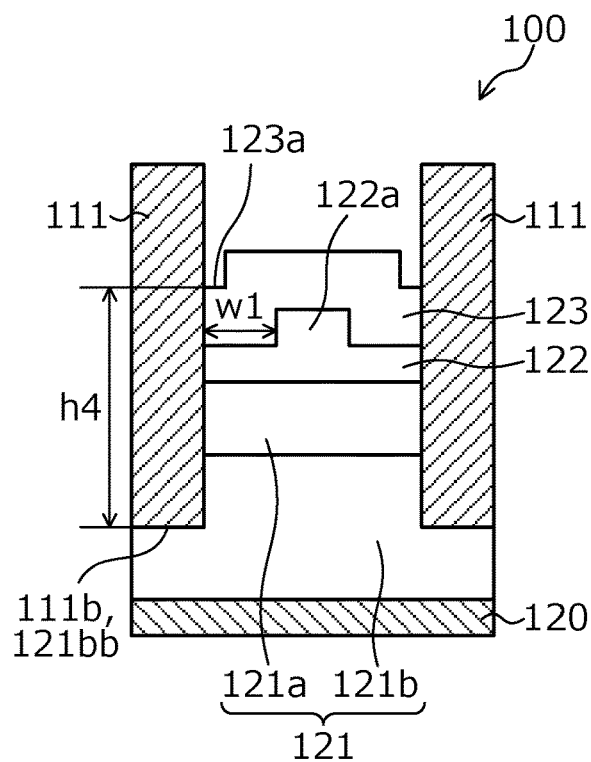
FIG. 6D is a cross-sectional view of another configuration example of the thin-film LN optical modulator according to the embodiment.

In the configuration examples depicted in FIG. 6B to FIG. 6D, the etching amount is increased more than that in FIG. 6A. In the configuration example in FIG. 6B, an entire area of the portions (the recesses 123a) of the buffer layer 123 where the electrodes 111 are provided is etched. Further, the electrodes 111 are formed on the thin-film LN layer 122 (steps 122b) by vapor deposition, etc.

As a result, the positions in the height direction of the bottoms 111b of the electrodes 111 provided on the steps 122b are lower, by a height h2, than the positions of the recesses 123a of the buffer layer 123 before etching. Further, the electrodes 111 are provided with the bottoms 111b thereof disposed in the portions of the steps 122b of the thin-film LN layer 122, whereby the electrodes 111 have the distance (width) w1 from the optical waveguide 122a and may be as close as possible thereto.

In the configuration example in FIG. 6C, an entire area of the portions (the recesses 123a) of the buffer layer 123 where the electrodes 111 are to be formed is etched. In addition, entire portions of the thin-film LN layer 122 as well as a predetermined amount of the first intermediate layer 121a are etched, thereby forming steps 121ab in portions of the first intermediate layer 121a. Further, the electrodes 111 are formed on the steps 121ab of the first intermediate layer 121a.

As a result, the positions in the height direction of the bottoms 111b of the electrodes 111 provided on the steps 121ab are lower, by a height h3, than the positions of the recesses 123a of the buffer layer 123 before etching. Further, the electrodes 111 are provided with the bottoms 111b thereof disposed in the portions of the steps 121ab of the first intermediate layer 121a, whereby the electrodes 111 have the distance (width) w1 from the optical waveguide 122a and may be as close as possible thereto.

In the configuration example in FIG. 6D, an entire area of the portions (the recesses 123a) of the buffer layer 123 where the electrodes 111 are to be formed is etched. In addition, entire portions of the thin-film LN layer 122 and the first intermediate layer 121a as well as a predetermined amount of the second intermediate layer 121b are etched, thereby forming steps 121bb in portions of the second intermediate layer 121b. Further, the electrodes 111 are formed on the steps 121bb of the second intermediate layer 121b.

As a result, the positions in the height direction of the bottoms 111b of the electrodes 111 provided on the steps 121bb that are lower, by a height h4, than the positions of the recesses 123a of the buffer layer 123 before etching. Further, the electrodes 111 are provided with the bottoms 111b disposed in the portions of the steps 121bb of the second intermediate layer 121b, whereby the electrodes 111 have the distance (width) w1 from the optical waveguide 122a and may be as close as possible thereto.

The configuration example in FIG. 6B has a greater etching amount than does the configuration example in FIG. 6A; the configuration example in FIG. 6C has a greater etching amount than does the configuration example in FIG. 6B; and the configuration example in FIG. 6D has a greater etching amount than does the configuration example in FIG. 6C. The greater is the etching amount, the greater the electric field efficiency is enhanced; however, process difficulty also increases and therefore, an optimal structure may be selected with consideration of ease of manufacture and characteristics such as necessary electric field efficiency.

According to the thin-film LN optical modulators 100 of the configuration examples depicted in FIGS. 6A to 6D, the thin-film LN optical modulators 100 in which the scattering loss of the optical waveguide 122a is small and the electric field efficiency is high may be realized.

Here, the positions of the bottoms 111b of the electrodes 111 having the heights h1 to h4 depicted in FIGS. 6A, 6B, 6C, and 6D are set to be lower than the position of the surface (the recesses 123a) of the buffer layer 123 to thereby lower the impedance. Accordingly, the intermediate layer 121 (the second intermediate layer 121b) may be formed to have a greater thickness as compared to in an instance in which the positions of the bottoms 111b of the electrodes 111 are set to be at the surface (the recesses 123a) of the buffer layer 123. As a result, the thin-film LN optical modulator 100 may simultaneously achieve narrow electrode spacing and high impedance.

Figure 7A:
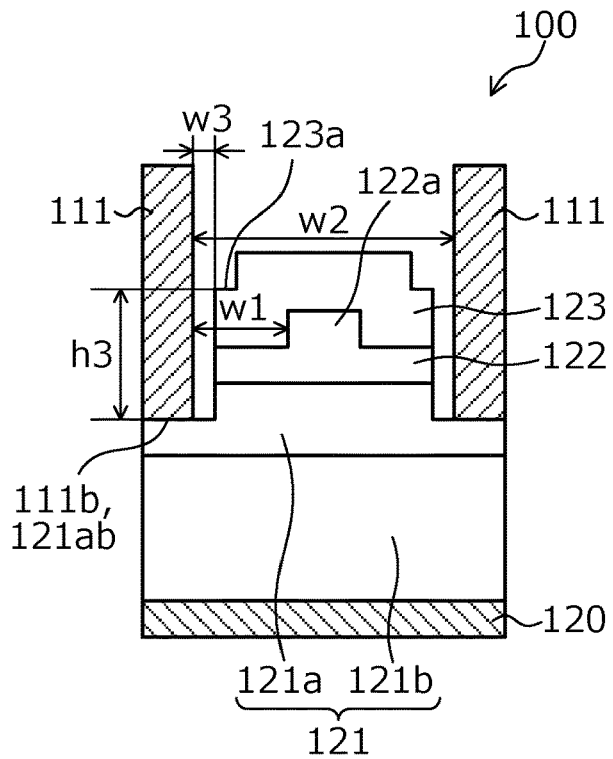
FIG. 7A is a cross-sectional view of another configuration example of the thin-film LN optical modulator according to the embodiment.
Figure 7B:
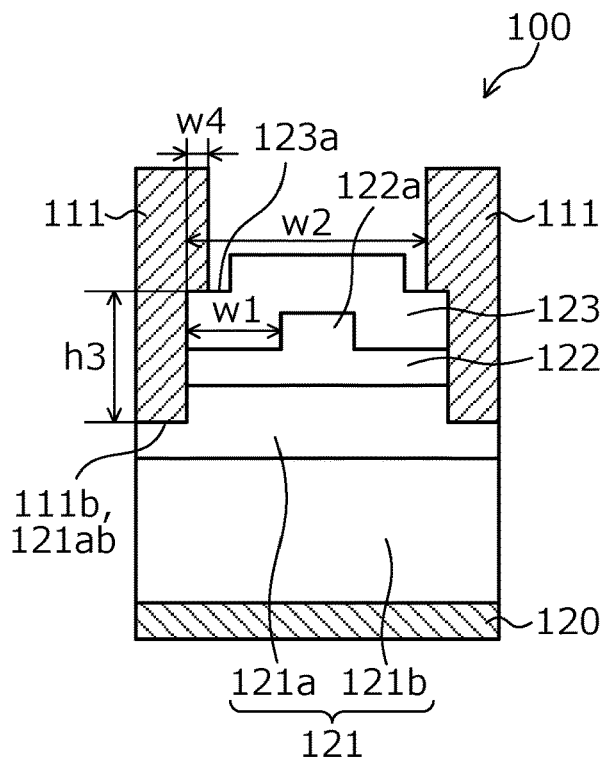
FIG. 7B is a cross-sectional view of another configuration example of the thin-film LN optical modulator according to the embodiment.

FIGS. 7A and 7B are cross-sectional views of other configuration examples of the thin-film LN optical modulator according to the embodiment. In the configuration example described using FIGS. 6A, 6B, 6C, and 6D, an example in which sidewalls of the electrodes 111 are in contact with the buffer layer 123 is described.

Nonetheless, in actuality, due to manufacturing tolerances, etc., the sidewalls of the electrodes 111 may be apart from the buffer layer 123. For example, due to misalignment of placement positions, errors in opening diameters, etc. of openings of a mask provided on the buffer layer 123 during etching, or openings of a mask formed on the buffer layer 123 during formation of the electrodes 111, gaps may occur between the sidewalls of the electrodes 111 and the sidewalls of the buffer layer 123. FIGS. 7A and 7B depict configuration examples in instances in which the sidewalls of the electrodes 111 are apart from sidewalls of the buffer layer 123. Further, in the configuration examples in FIGS. 7A and 7B, configuration examples are depicted in which the etching amount is assumed to be h3, and the bottoms 111b of the electrodes 111 are positioned on the steps 121ab of the first intermediate layer 121a (corresponds to FIG. 6C).

As depicted in FIG. 7A, the buffer layer 123 having a predetermined thickness is stacked on the thin-film LN layer 122. Here, in the buffer layer 123, at the surface thereof, the recesses 123a are formed corresponding to the convex ridge portion of the optical waveguide 122a. Thereafter, the portions of the buffer layer 123 and the thin-film LN layer 122, and portions of the first intermediate layer 121a where the electrodes 111 are provided are etched.

During this etching, a portion (width w2) of the buffer layer 123 having the optical waveguide 122a as a center and extending to the steps 121ab is masked and in the mask, openings are provided in portions corresponding to the steps 121ab. Further, portions of the buffer layer 123 are etched to a predetermined depth from the openings in the mask. As a result, in portions where the electrodes 111 are to be provided, portions of the buffer layer 123 to the first intermediate layer 121a are etched, thereby forming the steps 121ab in the first intermediate layer 121a.

Further, the electrodes 111 are formed on the steps 121ab of the first intermediate layer 121a. During formation of the electrodes 111 as well, a portion (the width w2) of the buffer layer 123 having the optical waveguide 122a as a center and extending to the steps 121ab is masked and in the mask, openings are provided in portions corresponding to the steps 121ab. Further, from the openings in the mask, the electrodes 111 are formed by vapor deposition.

Here, due to misalignment of placement positions, errors in opening diameters, etc. of the openings of the mask provided on the buffer layer 123 during etching, or the openings of the mask formed on the buffer layer 123 during formation of the electrodes 111, gaps w3 may occur between the sidewalls of the electrodes 111 and the sidewalls of the buffer layer 123. The gaps w3, for example, occur in an instance in which the opening diameter of the mask during the formation of the electrodes 111 is greater than the opening diameter of the mask during etching of the buffer layer 123.

In this manner, even in an instance in which the gaps w3 occur between the sidewalls of the electrodes 111 and the sidewalls of the buffer layer 123, the positions of the steps 121ab in the height direction are lower, by the height h3, than the positions of the recesses 123a before etching. Further, the bottoms 111b of the electrodes 111 are provided on the steps 121ab of the first intermediate layer 121a, whereby the electrodes 111 have the distance (width) w1 from the optical waveguide 122a and may be as close as possible thereto. The width w1 corresponds to a predetermined thickness when the buffer layer 123 is stacked on the thin-film LN layer 122 and has an effect of confining light to the optical waveguide 122a.

As a result, even in an instance in which the gaps w3 are between the sidewalls of the electrodes 111 and the sidewalls of the buffer layer 123, the thickness itself of the buffer layer 123 is assured with the optical waveguide 122a as a center and the electrodes 111 may be disposed near the optical waveguide 122a.

Further, conversely to the configuration example in FIG. 7A, due to manufacturing tolerances, etc., portions (the sidewalls) of the electrodes 111 may be positioned further inward than are the steps 121ab, whereby portions corresponding to the gaps w3 are eliminated. For example, misalignment of placement positions, errors in opening diameters, etc. of openings of the mask provided on the buffer layer 123 during etching or the openings of the mask provided on the buffer layer 123 during formation of the electrodes 111 is assumed to occur. As a result, portions (the sidewalls) of the electrodes 111 may be positioned in portions of the recesses 123a of the buffer layer 123.

FIG. 7B depicts a configuration example in an instance in which portions (sidewalls facing the optical waveguide 122a) of the electrodes 111 are formed riding on the recesses 123a of the buffer layer 123.

As depicted in FIG. 7B, the buffer layer 123 having a predetermined thickness is stacked on the thin-film LN layer 122. Here, in the buffer layer 123, at the surface thereof, the recesses 123a are formed corresponding to the convex ridge portion of the optical waveguide 122a. Thereafter, the portions of the buffer layer 123 where the electrodes 111 are to be provided (the recesses 123a) are etched. During this etching, a portion (the width w2) of the buffer layer 123 having the optical waveguide 122a as a center and extending to the steps 123b is masked and in the mask, openings are provided in portions corresponding to the steps 121ab. Further, portions of the buffer layer 123 are etched from the openings. By this etching, the steps 121ab are formed in the first intermediate layer 121a at portions thereof where the electrodes 111 are to be provided.

Further, the electrodes 111 are formed on the steps 121ab of the first intermediate layer 121a. During the formation of the electrodes 111 as well, portions (the width w2) of the buffer layer 123 having the optical waveguide 122a as a center and extending to the steps 121ab is masked and in the mask, openings are provided in portions corresponding to the steps 121ab. Further, from the openings in the mask, the electrodes 111 are formed by vapor deposition.

Here, due to misalignment of placement positions, errors in opening diameters, etc. of the openings of the mask provided on the buffer layer 123 during etching, or the openings of the mask formed on the buffer layer 123 during formation of the electrodes 111, portions of the sidewalls of the electrodes 111 are positioned in the recesses 123a of the buffer layer 123. The electrodes 111 are disposed in a shape having a width w4 (corresponds to an amount of overlap) riding on the recesses 123a. The width w4, for example, occurs in an instance in which the diameter of the openings of the masking during formation of the electrodes 111 is narrower than the diameter of the openings of the mask during etching of the buffer layer 123.

In this manner, even when the sidewalls of the electrodes 111 are positioned in portions of the recesses 123a of the buffer layer 123, the positions of the steps 121ab in the height direction are lower, by the height h3, that the positions of the recesses 123a of the buffer layer 123 before etching. Further, the electrodes 111 are provided in portions of the steps 121ab of the first intermediate layer 121a, whereby the electrodes 111 have the distance (width) w1 from the optical waveguide 122a and may be as close as possible thereto. The width w1 corresponds to a predetermined thickness when the buffer layer 123 is stacked on the thin-film LN layer 122 and has an effect of confining light to the optical waveguide 122a.

In this manner, even when the sidewalls of the electrodes 111 are positioned having the width w4 overlapping on the recesses 123a of the buffer layer 123, the thickness itself of the buffer layer 123 is assured centered around the optical waveguide 122a. In addition, the electrodes 111 may be disposed near the optical waveguide 122a.

Even in the thin-film LN optical modulators 100 of the configuration examples depicted in FIGS. 7A and 7B, the thin-film LN optical modulator 100 in which the scattering loss of the optical waveguide 122a is small and the electric field efficiency is high may be realized. Further, narrow electrode spacing and high impedance may be simultaneously achieved.

Further, in both FIGS. 7A and 7B, configuration examples in which the etching amount is h3 (corresponds to FIG. 6C) are depicted. Without limitation hereto, the etching amount may be set for the configuration examples having h1 in FIG. 6A to h4 in FIG. 6D. For any of the etching amounts h1 to h4, the electrodes 111 have the distance (width) w1 from the optical waveguide 122a and may be as close as possible thereto.

As described above, the thin-film LN optical modulator 100 has the intermediate layer, the thin-film LN layer of X-cut lithium niobate, and the buffer layer are stacked on the substrate, the optical waveguide formed in the thin-film LN layer, and the driving electrodes. The intermediate layer is provided, improving DC drift and the intermediate layer is formed by the upper first intermediate layer and the lower second intermediate layer. Further, between the substrate and the first intermediate layer for suppressing DC drift, the second intermediate layer 121b having permittivity lower than that of the first intermediate layer is provided. As a result, overall permittivity may be reduced from the perspective of the electrodes 111, impedance may be increased with the narrow electrode interval as is, and connection of a peripheral circuit may be facilitated and highly efficient.

Further, in the thin-film LN optical modulator 100, the thickness of the second intermediate layer may be set to be thicker than the thickness of the first intermediate layer, the thickness of the first intermediate layer and the thickness of the second intermediate layer may be set to be substantially equal to each other, or the thickness of the second intermediate layer may be set to be thinner than the thickness of the first intermediate layer. In these instances, the thicknesses may be suitably selected according to the impedance to be obtained, under the condition that permittivity of the second intermediate layer is smaller than permittivity of the first intermediate layer.

Further, in the first intermediate layer of the thin-film LN optical modulator 100, a material containing a metal element of any of group 3 to group 18 of the periodic table, a material containing an oxide of indium and silicon oxide, a material containing an oxide of titanium and silicon oxide, a material containing an oxide of tin and silicon oxide, a material containing an oxide of germanium and silicon oxide, a material containing an oxide of zinc and silicon oxide may be used. Further, in addition to any of these materials, a material containing an oxide of another metal or semiconductor element may be further used. Moreover, the first intermediate layer may be formed using any one of a mixture or compound of silicon oxide and an oxide of at least one species of a metal element of any of group 3 to group 18 of the periodic table, a mixture or compound of silicon oxide and an oxide of at least one species of a semiconductor element excluding silicon, and a mixture or compound of silicon oxide and an oxide containing at least one species of a semiconductor element excluding silicon and at least one species of a metal element of any of group 3 to group 18 of the periodic table. These materials are suitably selected, whereby DC drift may be effectively suppressed.

Further, the thin-film LN optical modulator 100 may be configured as an X-cut LN modulator in which the thin-film LN layer contains X-cut lithium niobate, electrodes are disposed on the sides of the optical waveguide, and electric field is applied from a horizontal direction of the optical waveguide. Further, configuration may be as a Z-cut LN modulator in which the thin-film LN layer contains Z-cut lithium niobate, an electrode is disposed on the top of the optical waveguide, and electric field is applied from a vertical direction of the optical waveguide. Further, in either instance, narrow electrode spacing and high impedance may be obtained simultaneously.

Further, the thin-film LN optical modulator 100 may be configured such that the bottoms of the electrodes are provided at positions lower than the position of the surface of the buffer layer, whereby the electrodes may be as closer as possible to the optical waveguide. For example, configuration may be such that the bottoms of the electrodes are provided on steps at a predetermined depth position in the buffer layer, or the bottoms may be provided on steps of the thin-film LN layer, or the bottoms may be provided on steps of the first intermediate layer, or the bottoms may be provided on steps of the second intermediate layer. As a result, by the buffer layer having a predetermined thickness with respect to the top and the sidewalls of the optical waveguide, the light may be confined to the optical waveguide, scattering loss may be reduced, the electrodes may be as close as possible to the optical waveguide, and the electric field efficiency may be enhanced.

As a result, according to the embodiment, by the 2-layer intermediate layer, with narrow electrode spacing, impedance may be increased and connection of a peripheral circuit may be facilitated and highly efficient.

Further, in the embodiment described above, while the ridged-shaped optical waveguide is described as an example, configuration is not limited hereto. For example, configuration may be such that in the buffer layer, an optical waveguide is formed using X-cut lithium niobate and has a cross-section that is a rectangular core; with this configuration as well, actions and effects similar to those described above may be obtained.

According to the embodiments, narrow electrode spacing and high impedance may be obtained simultaneously.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide device comprising:
   an intermediate layer, a thin-film LN layer including X-cut lithium niobate, and a buffer layer covering the thin-film LN layer, wherein the intermediate layer, the thin-film LN layer, and the buffer layer are stacked on a substrate;
   a ridge-type optical waveguide formed in the thin-film LN layer; and
   an electrode for driving, wherein
       the intermediate layer is formed by an upper first intermediate layer and a lower second intermediate layer that is in direct contact with the upper first intermediate layer, the second intermediate layer having a permittivity that is smaller than a permittivity of the first intermediate layer.

2. The optical waveguide device according to claim 1, wherein the first intermediate layer includes a material containing a metal element of any of group 3 to group 18 of a periodic table.

3. The optical waveguide device according to claim 1, wherein the first intermediate layer includes a material containing an oxide of indium and silicon oxide.

4. The optical waveguide device according to claim 3, wherein the first intermediate layer further includes a material containing an oxide of another metal or semiconductor element.

5. The optical waveguide device according to claim 1, wherein the first intermediate layer includes a material containing an oxide of titanium and silicon oxide.

6. The optical waveguide device according to claim 5, wherein the first intermediate layer further includes a material containing an oxide of another metal or semiconductor element.

7. The optical waveguide device according to claim 1, wherein the first intermediate layer includes a material containing an oxide of tin and silicon oxide.

8. The optical waveguide device according to claim 7, wherein the first intermediate layer further includes a material containing an oxide of another metal or semiconductor element.

9. The optical waveguide device according to claim 1, wherein the first intermediate layer includes a material containing an oxide of germanium and silicon oxide.

10. The optical waveguide device according to claim 9, wherein the first intermediate layer further includes a material containing an oxide of another metal or semiconductor element.

11. The optical waveguide device according to claim 1, wherein the first intermediate layer includes a material containing an oxide of zinc and silicon oxide.

12. The optical waveguide device according to claim 11, wherein the first intermediate layer further includes a material containing an oxide of another metal or semiconductor element.

13. The optical waveguide device according to claim 1, wherein the first intermediate layer includes a mixture or compound of silicon oxide and an oxide of at least one species of a metal element of any of group 3 to group 18 of a periodic table.

14. The optical waveguide device according to claim 1, wherein the first intermediate layer includes a mixture or compound of silicon oxide and an oxide of at least one species of a semiconductor element excluding silicon.

15. The optical waveguide device according to claim 1, wherein the first intermediate layer includes a mixture or compound of silicon oxide and an oxide including at least one species of a semiconductor element excluding silicon and at least one species of a metal element of any of group 3 to group 18 of a periodic table.

16. The optical waveguide device according to claim 1, wherein a bottom of the electrode is provided at a position lower than is a position of a surface of the buffer layer.

17. The optical waveguide device according to claim 1, wherein a bottom of the electrode is provided on a step of a predetermined depth position in the buffer layer.

18. The optical waveguide device according to claim 1, wherein a bottom of the electrode is provided on a step of the thin-film LN layer.

19. The optical waveguide device according to claim 1, wherein a bottom of the electrode is provided on a step of the first intermediate layer.

20. The optical waveguide device according to claim 1, wherein a bottom of the electrode is provided on a step of the second intermediate layer.

* * * * *